Aug. 3, 1937.　　A. B. KLEINMANN　　2,089,124
DEVICE FOR TESTING GEARS
Filed March 6, 1937
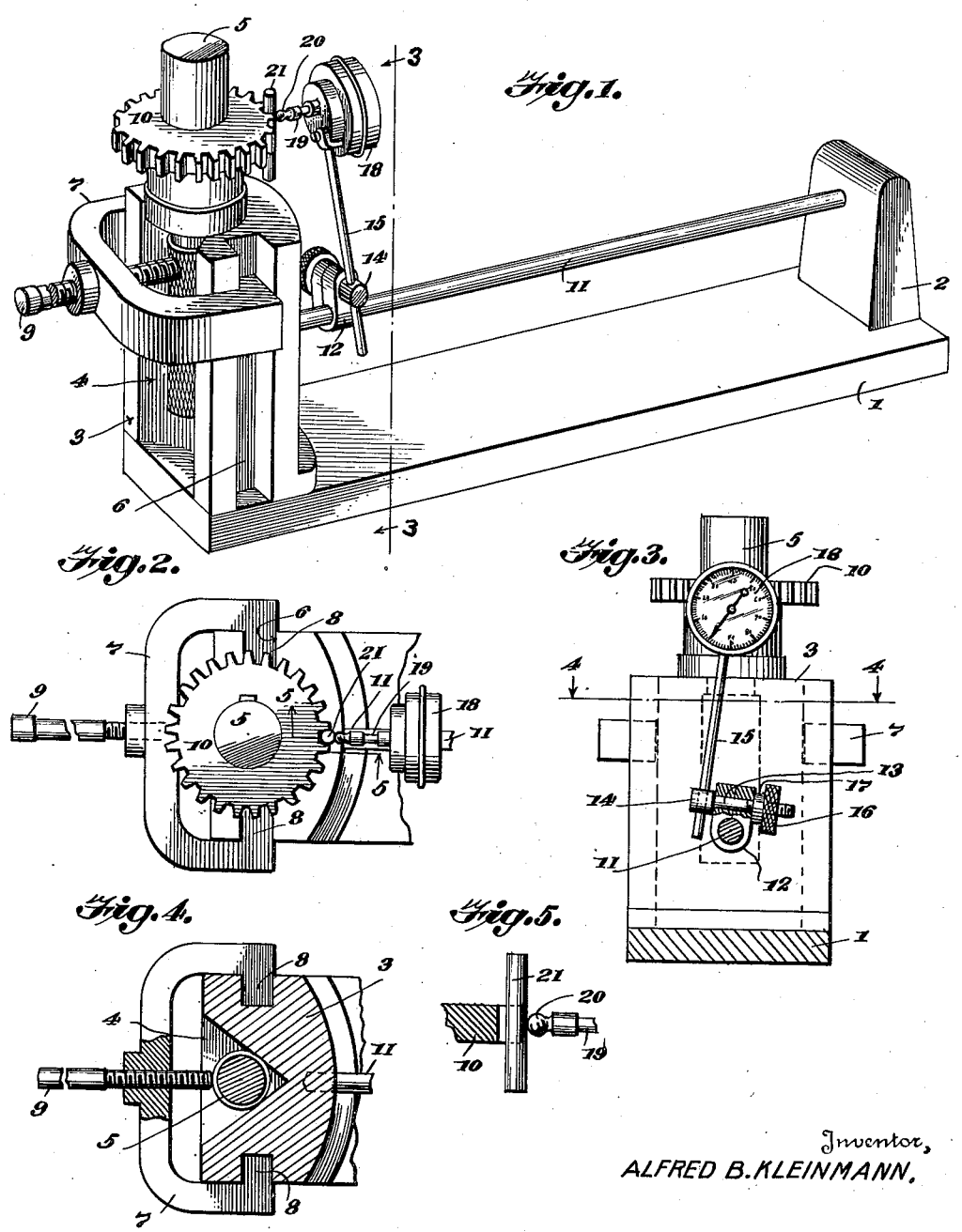

Patented Aug. 3, 1937

2,089,124

UNITED STATES PATENT OFFICE 2,089,124

DEVICE FOR TESTING GEARS

Alfred B. Kleinmann, Cincinnati, Ohio

Application March 6, 1937, Serial No. 129,483

3 Claims. (Cl. 33—174)

This invention relates to a device for testing gears.

An object of the invention is the construction of a simple and efficient device for accurately testing gears or similar units.

Another object of the invention is the construction of a novel supporting unit, including a stand and clamping means thereon, for efficiently holding any size and type plug, as the operator may desire.

A further object of the invention is the construction of a testing device in which a novel swivel unit is employed for supporting the indicator.

With the foregoing and other objects in view, my invention comprises certain novel combinations, constructions and arrangements of parts as will be hereinafter fully described, illustrated in the accompanying drawing, and more particularly pointed out in the appended claims.

In the drawing:

Figure 1 is a perspective view of a device constructed in accordance with the present invention.

Figure 2 is a top plan view of the left hand end of the device, as illustrated in Figure 1.

Figure 3 is a transverse sectional view, taken on line 3—3, Figure 1, and looking in the direction of the arrows.

Figure 4 is a horizontal sectional view, taken on line 4—4, Figure 3, and looking in the direction of the arrows.

Figure 5 is an enlarged sectional view, and partly in side elevation, taken on line 5—5, Figure 2.

Referring to the drawing, in which I have shown the preferred embodiment of my invention, I designates a baseboard and 2 is the outboard support, at one end of said baseboard. This baseboard constitutes a support, and may be made from any material desired. At the opposite end of the baseboard I, to that carrying support 2, I provide a vertical stand 3. This stand 3 has in its outer face a vertically-extending V-shaped socket 4 for receiving a plug 5; it is to be understood that any size and type of plug may be used, as the operator desires. In the sides of stand 3 are vertically-extending slots 6; these slots being open at their upper ends and closed by baseboard I at their lower ends. A strap clamp 7 is provided, having its inwardly-extending fingers 8 positioned in the vertical slots 6. A screw 9 extends horizontally through the center of strap clamp 7, with its inner end engaging plug 5. Therefore, by tightening screw 9 plug 5 will be securely held in position within the V-shaped socket 4.

A gear 10 is supported upon plug 5, and this gear may be of any type which the operator desires to test.

A horizontal beam or rod 11 is supported at one end upon the outboard support 2 and its other end is supported upon the stand 3. A U-shaped swivel 12 is mounted on rod 11 (Fig. 3) with a shaft 13 extending through its split ends. Shaft 13 is provided at one end with head 14, carrying stem 15, and the opposite end of shaft 13 is threaded, with nut 16 thereon. Nut 16 is preferably provided on its inner face with an integral collar 17, which collar engages the swivel 12, and gives more space for the operator's fingers to grasp the major part of the nut, for rotating the same, either to lock the nut upon the swivel, or remove the nut from the threaded end of the shaft 13. On the upper end of stem 15 is suitably mounted an indicator 18. Therefore it will be seen that by reason of the adjustability of the swivel and its cooperating parts upon rod 11, the indicator can be accurately adjusted to and from the gear that is being tested, as well as transversely of the gear.

The indicator 18 is provided with a plunger 19, and on the outer end of plunger 19 is an indicator ball 20. A pin 21 is shown positioned between two contiguous teeth of gear 10, with indicator ball 20 pressing against said pin 21.

In operation it will be understood that the swivel 12 can be slid along the horizontal rod 11 to bring the indicator ball 20 to the desired position, both vertically and horizontally, in relation to the pin 21, namely, central, then the swivel is tightened through shaft 13 and nut 16, so that the parts are tightly held in an accurate testing position. Then when the gear 10, that is being tested, is turned to pass the indicator ball 20 the arrow of the indicator registers zero, and should register zero on any location of the cut made by the cutter on the machine in question, if the cuts are to be desired precisely uniform or identical.

While I have described the preferred embodiment of my invention and illustrated the same in the accompanying drawing, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In a device of the class described, the combination with a baseboard, of an upstanding outboard support at one end of said baseboard and a stand at the other end of said baseboard, a strap clamp on said stand, a horizontal rod supported at one end on said outboard support and at its other end upon said stand entirely above said baseboard, an indicator, and means adjustably mounting said indicator upon said horizontal rod.

2. In a device of the class described, the combination of a support including a stand, said stand provided with a vertical plug-receiving socket, said stand provided with vertical slots, a strap clamp slidably mounted in said slots, and an indicator provided with means adjustably mounting same on said support.

3. In a device of the class described, the combination of a support including a vertical stand at one end thereof, said stand provided in its outer face with a vertical V-shaped socket open at its upper end, said stand provided in its side faces with vertical slots open at their upper ends, said support closing the lower ends of said socket and slots, a strap clamp provided with inwardly-extending fingers positioned in said slots, a horizontal screw on said strap clamp and having its inner end extending into said vertical V-shaped socket, and an indicator provided with means adjustably mounting same on said support, substantially as shown and described.

ALFRED B. KLEINMANN.